US008780367B2

(12) United States Patent
Yokota et al.

(10) Patent No.: US 8,780,367 B2
(45) Date of Patent: Jul. 15, 2014

(54) DETECTING DEVICE, DETECTING METHOD, AND IMAGE FORMING APPARATUS

(75) Inventors: Shusaku Yokota, Kanagawa (JP); Masao Ito, Kanagawa (JP); Fumio Furusawa, Kanagawa (JP); Katsuhiko Nakaie, Kanagawa (JP); Junichi Morooka, Kanagawa (JP); Kota Ninomiya, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 256 days.

(21) Appl. No.: 13/157,786

(22) Filed: Jun. 10, 2011

(65) Prior Publication Data

US 2012/0099126 A1 Apr. 26, 2012

(30) Foreign Application Priority Data

Oct. 22, 2010 (JP) ................................ 2010-238007

(51) Int. Cl.
*G06F 3/12* (2006.01)

(52) U.S. Cl.
USPC ............ 358/1.13; 358/474; 358/509; 399/16; 399/46; 399/47; 399/207

(58) Field of Classification Search
CPC ........... B65H 2511/21; B65H 2515/60; B65H 2553/414; B65H 7/14; H04N 1/12
USPC ........ 358/1.13, 474, 509; 399/16, 46–47, 207
See application file for complete search history.

(56) References Cited

U.S. PATENT DOCUMENTS

| | | | | |
|---|---|---|---|---|
| 4,673,282 | A | 6/1987 | Sogame | |
| 5,078,491 | A | 1/1992 | Johnston, Jr. | |
| 5,463,512 | A * | 10/1995 | Hashimoto et al. | 360/246.8 |
| 2008/0239140 | A1 | 10/2008 | Vinogradov | |
| 2009/0067861 | A1 * | 3/2009 | Miyoshi | 399/51 |
| 2009/0109504 | A1 * | 4/2009 | Hirokawa | 358/498 |

FOREIGN PATENT DOCUMENTS

JP 2010-114498 A 5/2010

OTHER PUBLICATIONS

Australian Office Action dated Mar. 19, 2013 in corresponding Australian Patent Application No. 2011202939.
Australian Office Action dated Dec. 17, 2013 in corresponding Australian Patent Application No. 2011202939.

* cited by examiner

*Primary Examiner* — Jacky X Zheng
(74) *Attorney, Agent, or Firm* — Sughrue Mion, PLLC

(57) ABSTRACT

A detecting device includes a detecting unit that detects an image on a medium transported in a transport path. The detecting unit includes a light emitter, a light receiver, and a light adjusting portion. The light emitter emits light toward the transport path in which the medium is transported. The light receiver receives reflected light of the light emitted from the light emitter. The light adjusting portion adjusts a quantity of light received by the light receiver according to a quantity of light emitted from the light emitter.

19 Claims, 11 Drawing Sheets

U.S. Patent Jul. 15, 2014 Sheet 3 of 11 US 8,780,367 B2

DETECTING DEVICE, DETECTING METHOD, AND IMAGE FORMING APPARATUS

CROSS-REFERENCE TO RELATED APPLICATIONS

This application is based on and claims priority under 35 USC 119 from Japanese Patent Application No. 2010-238007 filed Oct. 22, 2010.

BACKGROUND

Technical Field

The present invention relates to a detecting device, a detecting method, and an image forming apparatus equipped with the detecting device.

According to an aspect of the invention, there is provided a detecting device including a detecting unit that detects an image on a medium transported in a transport path. The detecting unit includes a light emitter, a light receiver, and a light adjusting portion. The light emitter emits light toward the transport path in which the medium is transported. The light receiver receives reflected light of the light emitted from the light emitter. The light adjusting portion adjusts a quantity of light received by the light receiver according to a quantity of light emitted from the light emitter.

BRIEF DESCRIPTION OF THE DRAWINGS

An exemplary embodiment of the present invention will be described in detail based on the following figures, wherein.

DETAILED DESCRIPTION

An example of a detecting device and an image forming apparatus according to an exemplary embodiment of the present invention will now be described with reference to FIGS. 1 to 11.

Overall Configuration

Figure 1:
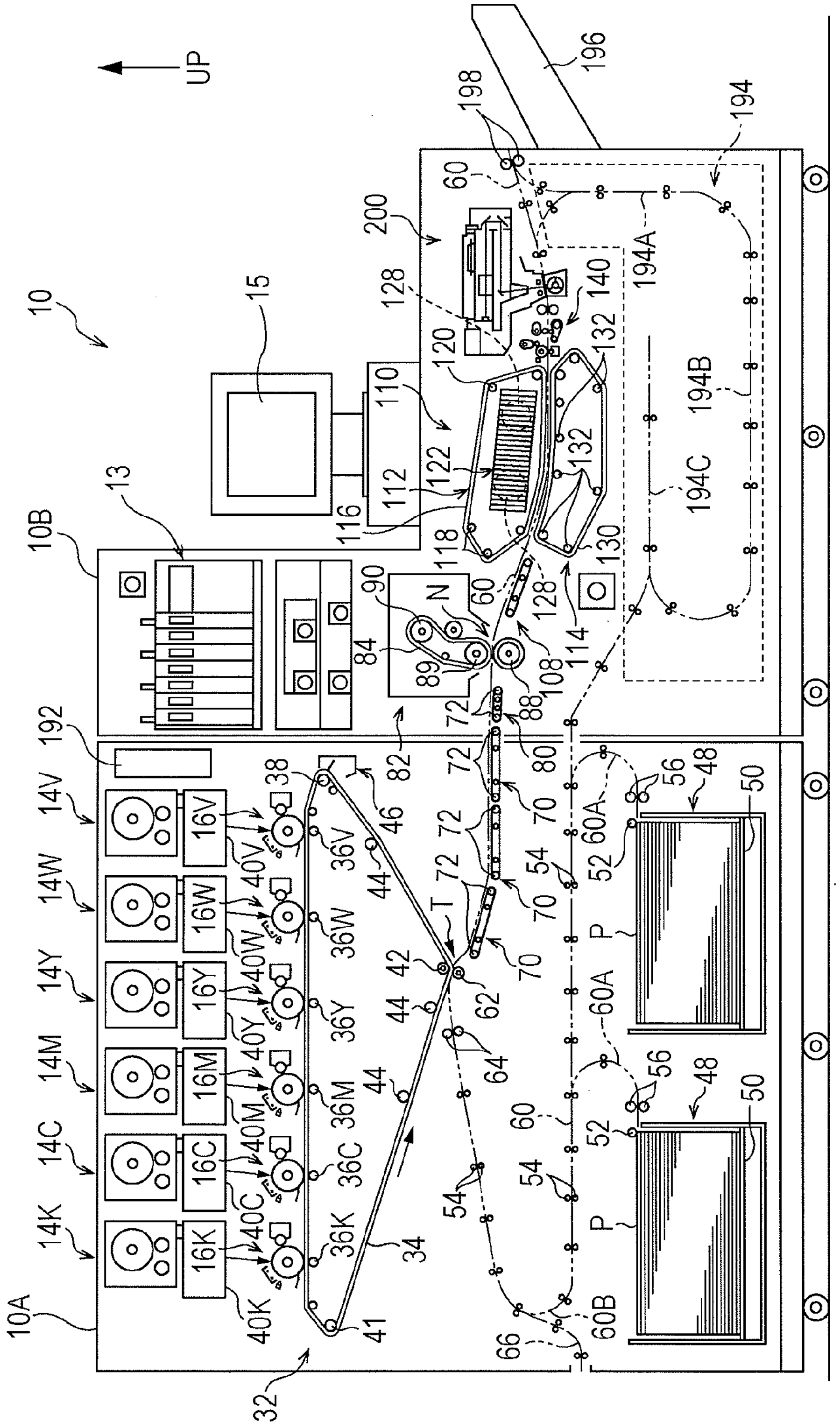
FIG. 1 schematically illustrates the configuration of an image forming apparatus according to an exemplary embodiment of the present invention.

Referring to FIG. 1, an image forming apparatus 10 according to this exemplary embodiment is configured to form a full-color image or a monochrome image and includes a first housing 10A that accommodates a first processing unit constituting a first side (i.e., a left side in FIG. 1) section in the horizontal direction, and a second housing 10B that is detachably connected to the first housing 10A and that accommodates a second processing unit constituting a second side (i.e., a right side in FIG. 1) section in the horizontal direction.

An upper portion of the second housing 10B is provided with an image-signal processor 13 that performs image processing on image data sent from an external device, such as a computer.

Toner cartridges 14V, 14W, 14Y, 14M, 14C, and 14K that respectively contain toners of a first special color (V), a second special color (W), yellow (Y), magenta (M), cyan (C), and black (K) are provided in a replaceable manner at an upper portion of the first housing 10A.

The first special color and the second special color are appropriately selected from colors excluding yellow, magenta, cyan, and black (but including a transparent color). With regard to each component in the following description, an alphabetic character V, W, Y, M, C, or K will be added as a suffix to the corresponding reference number if the first special color (V), the second special color (W), yellow (Y), magenta (M), cyan (C), and black (K) are to be differentiated from each other. If the first special color (V), the second special color (W), yellow (Y), magenta (M), cyan (C), and black (K) are not to be differentiated from each other, the suffixes V, W, Y, M, C, and K will be omitted.

Furthermore, six image forming units 16 corresponding to the toners of the respective colors are horizontally arranged below the respective toner cartridges 14 so as to correspond to the toner cartridges 14.

Exposure devices 40 provided for the respective image forming units 16 are each configured to receive the image data image-processed by the aforementioned image-signal processor 13 from the image-signal processor 13 and to emit a light beam L modulated in accordance with the image data onto a corresponding image bearing member 18, to be described below (see FIG. 2).

Figure 2:
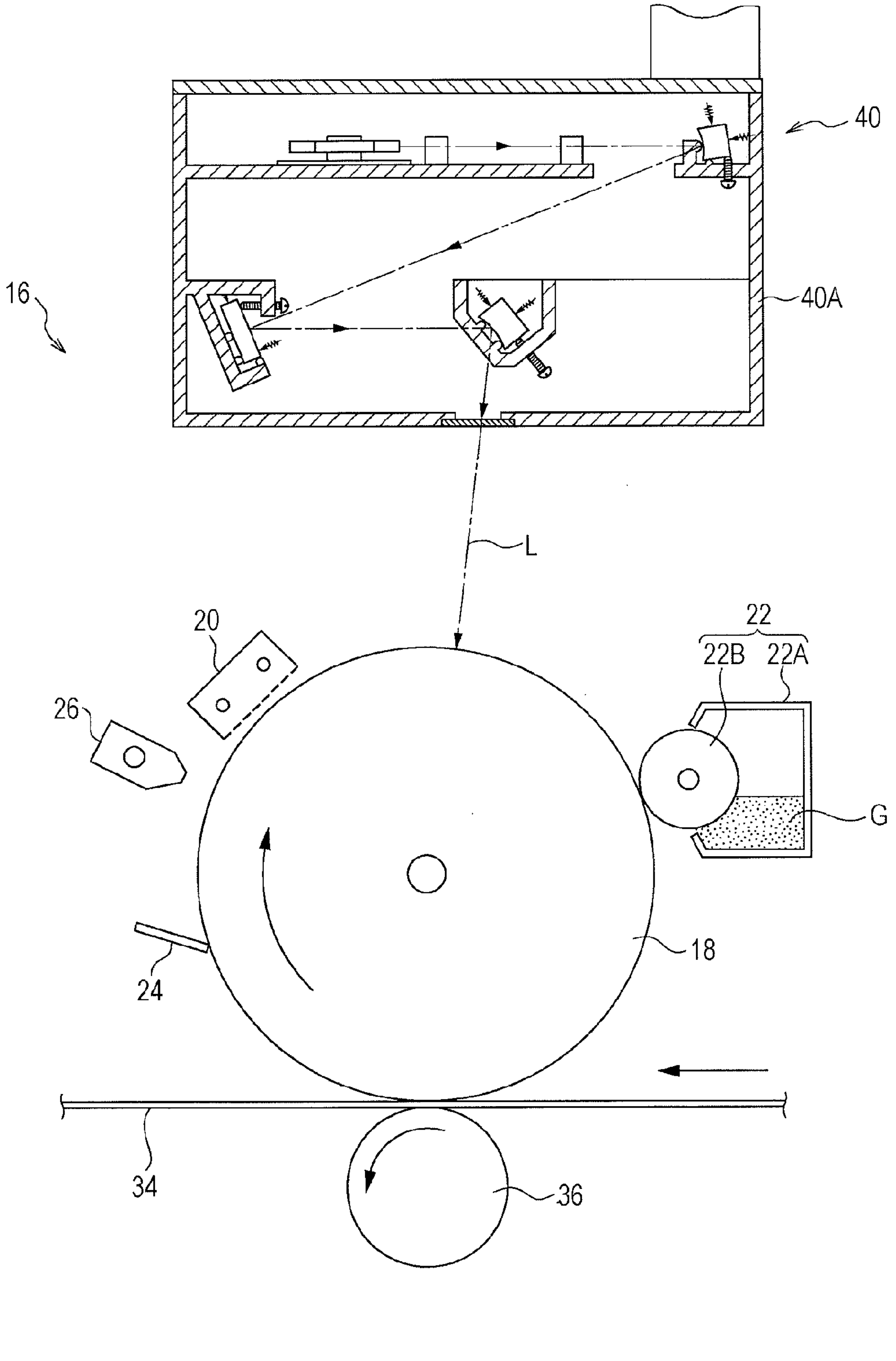
FIG. 2 is a cross-sectional view illustrating an image forming unit used in the image forming apparatus according to the exemplary embodiment of the present invention.

Referring to FIG. 2, each image forming unit 16 includes the image bearing member 18 that is rotationally driven in one direction (i.e., clockwise in FIG. 2). When the light beam L is emitted to the image bearing member 18 from the corresponding exposure device 40, an electrostatic latent image is formed on the image bearing member 18.

The image bearing member 18 is surrounded by a corona-discharge-type (noncontact-charging-type) scorotron charger 20 that electrostatically charges the image bearing member 18, a developing device 22 that uses a developer to develop the electrostatic latent image formed on the image bearing member 18 by the corresponding exposure device 40, a blade 24 serving as a removing member that removes residual developer from the image bearing member 18 after a transfer process, and a charge remover 26 that removes the electrostatic charge from the image bearing member 18 after the transfer process by emitting light thereto.

The scorotron charger 20, the developing device 22, the blade 24, and the charge remover 26 face the surface of the image bearing member 18 and are arranged in that order from the upstream side toward the downstream side in the rotational direction of the image bearing member 18.

The developing device 22 includes a developer container 22A that contains a developer G including a toner and a developing roller 22B that supplies the developer G contained in the developer container 22A to the image bearing member 18. The developer container 22A is connected to the corresponding toner cartridge 14 (see FIG. 1) via a toner supply path (not shown) so that the toner can be supplied from the toner cartridge 14.

As shown in FIG. 1, a transfer unit 32 is provided below the image forming units 16. The transfer unit 32 includes an annular intermediate transfer belt 34 that is in contact with the image bearing members 18, and first-transfer rollers 36 serving as first-transfer members that superpose and transfer toner images formed on the image bearing members 18 onto the intermediate transfer belt 34.

The intermediate transfer belt 34 is stretched around a drive roller 38 driven by a motor (not shown), a tension-applying roller 41 that applies tension to the intermediate transfer belt 34, an opposed roller 42 that is opposed to a second-transfer roller 62, to be described below, and multiple support rollers 44, and is rotationally moved in one direction (i.e., counterclockwise in FIG. 1) by the drive roller 38.

The first-transfer rollers 36 are disposed facing the image bearing members 18 of the corresponding image forming units 16 with the intermediate transfer belt 34 interposed therebetween. Furthermore, each first-transfer roller 36 is configured to receive a transfer bias voltage with a reversed polarity relative to the toner polarity from a power supply unit (not shown). With this configuration, the toner images formed on the image bearing members 18 are transferred onto the intermediate transfer belt 34.

A remover 46 that brings a blade into contact with the intermediate transfer belt 34 to remove residual toner, paper dust, and the like from the intermediate transfer belt 34 is disposed opposite the drive roller 38 with the intermediate transfer belt 34 interposed therebetween.

Two recording-medium accommodating sections 48 that accommodate recording media P serving as an example of media, such as paper sheets, are disposed below the transfer unit 32.

Each recording-medium accommodating section 48 can be pulled out from the first housing 10A. Above one end (i.e., right end in FIG. 1) of each recording-medium accommodating section 48 is provided a feed roller 52 that feeds each recording medium P from the recording-medium accommodating section 48 to a transport path 60.

A base plate 50 on which the recording media P can be placed is provided within each recording-medium accommodating section 48. When the recording-medium accommodating section 48 is pulled out from the first housing 10A, the base plate 50 descends in response to a command from a controller (not shown). With the descending of the base plate 50, a space that can be refilled with new recording media P by a user is formed in the recording-medium accommodating section 48.

When the recording-medium accommodating section 48 pulled out from the first housing 10A is inserted back into the first housing 10A, the base plate 50 ascends in response to a command from the controller. With the ascending of the base plate 50, the uppermost recording medium P placed above the base plate 50 is brought into abutment with the feed roller 52.

If multiple sheets of recording media P are fed from the recording-medium accommodating section 48, a separating roller 56 provided downstream of the feed roller 52 in the transport direction of the recording medium P (sometimes simply referred to as “downstream” hereinafter) separates the recording media P from each other in a one-by-one fashion. Multiple transport rollers 54 that transport each recording medium P downstream in the transport direction are provided downstream of the separating roller 56.

The transport path 60 provided between the recording-medium accommodating sections 48 and the transfer unit 32 has first turn sections 60A for the respective recording-medium accommodating sections 48 and a second turn section 60B. Each first turn section 60A is where the recording medium P fed from the corresponding recording-medium accommodating section 48 is turned leftward in FIG. 1. The second turn section 60B extends to a transfer position T between the second-transfer roller 62 and the opposed roller 42 and is where the recording medium P is turned rightward in FIG. 1.

The second-transfer roller 62 is configured to receive a transfer bias voltage with a reversed polarity relative to the toner polarity from the power supply unit (not shown). With this configuration, the toner images of the respective colors superposed and transferred on the intermediate transfer belt 34 are second-transferred by the second-transfer roller 62 onto the recording medium P transported along the transport path 60.

An auxiliary path 66 that extends from a side surface of the first housing 10A is provided so as to merge with the second turn section 60B of the transport path 60. A recording medium P fed from an additional recording-medium accommodating section (not shown) disposed adjacent to the first housing 10A can be introduced into the transport path 60 via the auxiliary path 66.

At the downstream side of the transfer position T, the first housing 10A is provided with multiple transport belts 70 that transport the recording medium P having toner images transferred thereon toward the second housing 10B, and the second housing 10B is provided with a transport belt 80 that transports the recording medium P transported to the transport belts 70 further downstream.

The multiple transport belts 70 and the transport belt 80 each have an annular shape and are each stretched around a pair of support rollers 72. The support rollers 72 of each pair are respectively disposed at the upstream side and the downstream side in the transport direction of the recording medium P. One of the support rollers 72 is rotationally driven so that the corresponding transport belt (or transport belt 80) is rotationally moved in one direction (i.e., clockwise in FIG. 1).

A fixing unit 82 that fixes the superposed toner image transferred on the surface of the recording medium P onto the recording medium P by using heat and pressure is provided downstream of the transport belt 80.

The fixing unit 82 includes a fixing belt 84 and a pressing roller 88 disposed so as to be in contact with the fixing belt 84 from below. The fixing belt 84 and the pressing roller 88 have a fixing section N therebetween for fixing the toner image onto the recording medium P by applying pressure and heat thereto.

The fixing belt 84 has an annular shape and is stretched around a drive roller 89 and a driven roller 90. The drive roller 89 faces the pressing roller 88 from above, and the driven roller 90 is disposed above the drive roller 89.

The drive roller 89 and the driven roller 90 each have a built-in heater, such as a halogen heater, whereby the fixing belt 84 can be heated.

As shown in FIG. 1, a transport belt 108 that transports the recording medium P transported from the fixing unit 82 further downstream is provided downstream of the fixing unit 82. The transport belt 108 has the same configuration as the transport belts 70.

A cooling unit 110 that cools the recording medium P heated by the fixing unit 82 is provided downstream of the transport belt 108.

The cooling unit 110 includes an absorbing device 112 that absorbs the heat from the recording medium P and a pressing device 114 that presses the recording medium P against the absorbing device 112. The absorbing device 112 is disposed at one side (i.e., the upper side in FIG. 1) of the transport path 60, and the pressing device 114 is disposed at the other side (i.e., the lower side in FIG. 1) of the transport path 60.

The absorbing device 112 includes an annular absorption belt 116 that comes into contact with the recording medium P so as to absorb the heat from the recording medium P. The absorption belt 116 is stretched around a drive roller 120, which transmits a driving force to the absorption belt 116, and multiple support rollers 118.

A heat sink 122 made of an aluminum material is provided within the inner periphery of the absorption belt 116. The heat sink 122 is in surface contact with the absorption belt 116 so as to release the heat absorbed by the absorption belt 116 therefrom.

Furthermore, fans 128 that take the heat from the heat sink 122 and discharge the heat outward are disposed at the rear side (i.e., the far side of the drawing in FIG. 1) of the second housing 10B.

The pressing device 114 that presses the recording medium P against the absorbing device 112 includes an annular pressing belt 130 that transports the recording medium P while pressing the recording medium P against the absorption belt 116. The pressing belt 130 is stretched around multiple support rollers 132.

A corrector 140 that nips and transports the recording medium P and corrects curling of the recording medium P is provided downstream of the cooling unit 110.

An in-line sensor 200 is provided downstream of the corrector 140. Specifically, the in-line sensor 200 serves an example of a detecting device that detects a toner density defect, an image defect, and an image position defect of the toner image fixed on the recording medium P, as well as the position and the shape of the recording medium P. A detailed description of the in-line sensor 200 will be provided later.

A discharge roller 198 is provided downstream of the in-line sensor 200. The discharge roller 198 discharges the recording medium P having an image formed on one face thereof to a discharge section 196 attached to a side surface of the second housing 10B.

If images are to be formed on both faces of the recording medium P, the recording medium P delivered from the in-line sensor 200 is transported to an inversion path 194 provided downstream of the in-line sensor 200.

The inversion path 194 includes a branch path 194A that branches off from the transport path 60, a sheet transport path 194B in which the recording medium P transported along the branch path 194A is transported toward the first housing 10A, and an inversion path 194C in which the recording medium P transported along the sheet transport path 194B is switched back by being turned in the reverse direction so that the front and rear faces of the recording medium P are inverted.

With this configuration, the recording medium P switched back in the inversion path 194C is transported toward the first housing 10A and is introduced into the transport path 60 provided above the recording-medium accommodating sections 48, whereby the recording medium P is transported again to the transfer position T.

Next, an image forming process of the image forming apparatus 10 will be described.

The image data image-processed by the image-signal processor 13 is sent to the exposure devices 40. The exposure devices 40 emit the light beams L in accordance with the image data so as to expose the corresponding image bearing members 18 electrostatically charged by the scorotron chargers 20 to the light beams L, thereby forming electrostatic latent images on the image bearing members 18.

As shown in FIG. 2, the electrostatic latent images formed on the respective image bearing members 18 are developed by the corresponding developing devices 22, whereby toner images of the respective colors, i.e., the first special color (V), the second special color (W), yellow (Y), magenta (M), cyan (C), and black (K), are formed.

As shown in FIG. 1, the toner images of the respective colors formed on the image bearing members 18 of the image forming units 16V, 16W, 16Y, 16M, 16C, and 16K are sequentially superposed and transferred onto the intermediate transfer belt 34 by the six first-transfer rollers 36V, 36W, 36Y, 36M, 36C, and 36K.

The toner images of the respective colors superposed and transferred on the intermediate transfer belt 34 are second-transferred by the second-transfer roller 62 onto the recording medium P transported from one of the recording-medium accommodating sections 48. The recording medium P having the toner images transferred thereon is transported by the transport belts 70 toward the fixing unit 82 provided within the second housing 10B.

The fixing unit 82 applies heat and pressure to the toner images of the respective colors on the recording medium P so as to fix the toner images onto the recording medium P. The recording medium P having the superposed toner image fixed thereon is cooled by passing through the cooling unit 110, and is subsequently sent to the corrector 140 where curling of the recording medium P is corrected.

The recording medium P having undergone the curling correction process subsequently undergoes an image-defect detection process by the in-line sensor 200, and is then discharged to the discharge section 196 by the discharge roller 198.

If another image is to be formed on a non-image face not having an image formed thereon (i.e., if duplex printing is to be performed), the recording medium P after passing the in-line sensor 200 is inverted in the inversion path 194. Then, the recording medium P is introduced into the transport path 60 provided above the recording-medium accommodating sections 48, and toner images are formed on the rear face of the recording medium P in accordance with the above-described procedure.

In the image forming apparatus 10 according to this exemplary embodiment, components for forming images of the first special color and the second special color (i.e., the image forming units 16V and 16W, the exposure devices 40V and 40W, the toner cartridges 14V and 14W, and the first-transfer rollers 36V and 36W) are attachable to the first housing 10A as additional components on the basis of the user's selection. Therefore, the image forming apparatus 10 may have a configuration without the additional components for forming the images of the first special color and the second special color, or a configuration with the additional components for forming the image of one of the first special color and the second special color.

The in-line sensor 200 will now be described.

In the following description, the lengthwise direction of the image forming apparatus 10 (i.e., the sub-scanning direction which corresponds to the transport direction of the recording medium P) will be defined as an X direction, the height direction of the image forming apparatus 10 will be defined as a Y direction, and the width direction of the image forming apparatus 10 (i.e., the main scanning direction) will be defined as a Z direction. The X direction, the Y direction, and the Z direction are substantially orthogonal to each other. Moreover, in the following description, the term "front surface" refers to the surface of the image forming apparatus 10 shown in FIG. 1, and the term "rear surface" refers to the surface of the image forming apparatus 10 opposite to the front surface.

Basic Configuration and Function of In-Line Sensor

Figure 3:
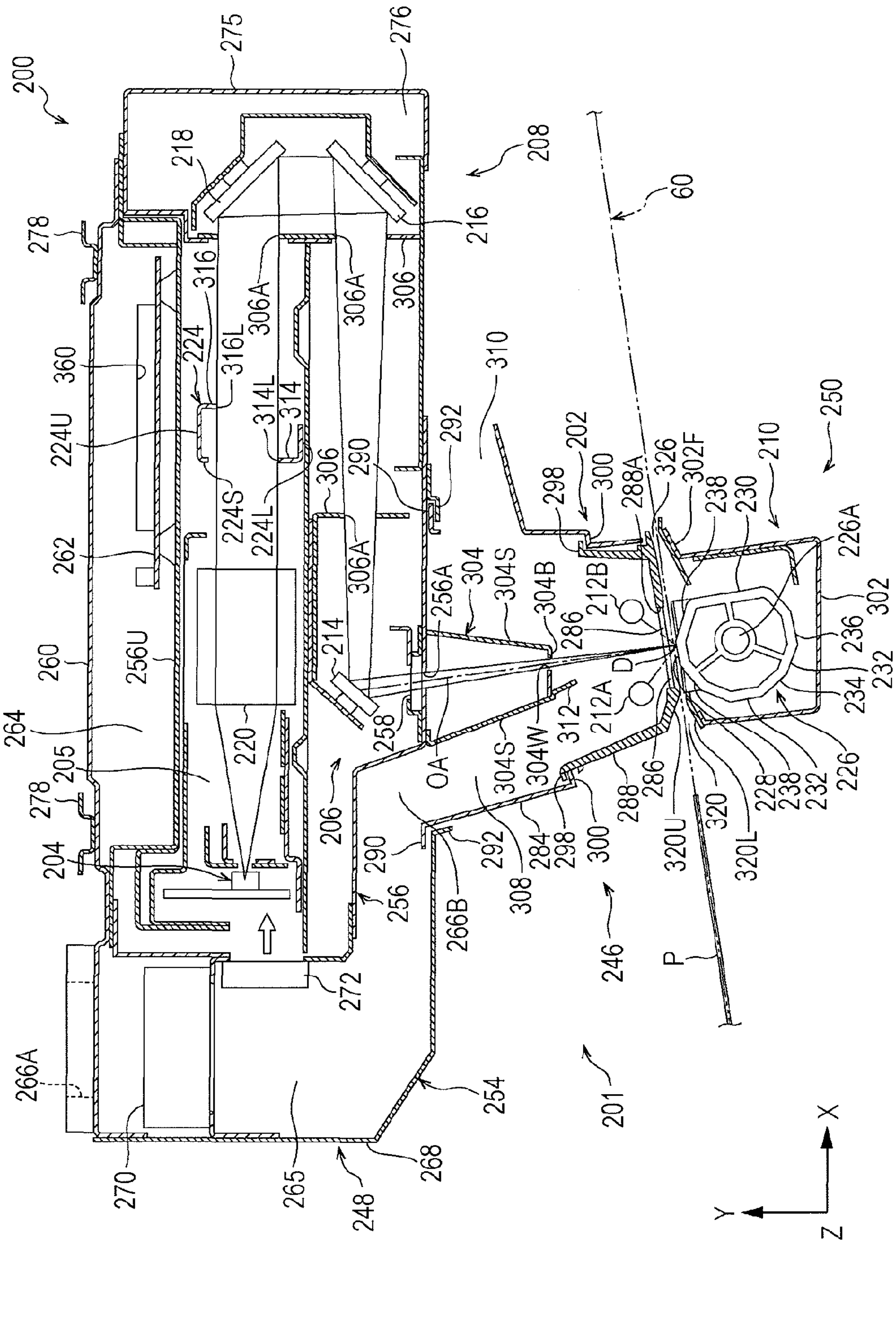
FIG. 3 is a cross-sectional view illustrating an in-line sensor according to the exemplary embodiment of the present invention.

Referring to FIG. 3, the in-line sensor 200 includes a light-emitting unit 202 that emits light toward the recording medium P having an image recorded thereon, an imaging unit 208 equipped with an imaging optical system 206 that forms an image of the light, emitted from the light-emitting unit 202 and reflected by the recording medium P, on a charge-coupled-device (CCD) sensor 204 serving as an example of a light receiver, and a setting unit 210 having various reference values set therein to be used when the in-line sensor 200 is in use or when calibration is performed. The CCD sensor 204 is configured to receive the light reflected by the recording medium P and to detect the image on the basis of the intensity of the light.

The light from the recording medium P includes reflected light reflected by the recording medium P and transmitted light transmitted through the recording medium P. More specifically, the light can be used for detecting the image formed on the recording medium P and information about the position and the shape of the recording medium P. The term "transmitted" includes transmission of light through a window glass as well as through an imaging lens or the like. Furthermore, the detection of the recording medium P includes detection of the position and the shape of the recording medium P.

The light-emitting unit 202 is disposed above the transport path 60 for the recording medium P and has lamps 212 serving as a pair of light emitters. The lamps 212 are xenon lamps extending longitudinally in the Z direction, and the length of the light emission range thereof is set to be greater than the width of a recording medium P having the maximum size. The two lamps 212 are symmetrically disposed with respect to an optical axis OA (i.e., design optical axis) of light reflected by the recording medium P and traveling toward the imaging unit 208. More specifically, the lamps 212 are symmetrically disposed with respect to the optical axis OA such that the angle of emission toward the recording medium P ranges between 45° and 50°.

Specifically, the two lamps 212 include a first lamp 212A provided at the upstream side in the transport direction of the recording medium P and a second lamp 212B provided opposite the first lamp 212A with the optical axis OA interposed therebetween.

The imaging optical system 206 includes a first mirror 214 by which the light guided along the optical axis OA is reflected in the X direction (i.e., toward the downstream side in the transport direction of the recording medium P in this exemplary embodiment), a second mirror 216 by which the light reflected by the first mirror 214 is reflected in the upward direction, a third mirror 218 by which the light reflected by the second mirror 216 is reflected toward the upstream side in the transport direction of the recording medium P, and a lens 220 that focuses (forms an image of) the light reflected by the third mirror 218 onto the CCD sensor 204. The CCD sensor 204 is disposed at the upstream side of the optical axis OA in the transport direction of the recording medium P.

The length of the first mirror 214 in the Z direction is set to be greater than the width of a recording medium P having the maximum size. The first mirror 214, the second mirror 216, and the third mirror 218 are configured to reflect the reflected light received by the imaging optical system 206 from the recording medium P while regulating the quantity of the reflected light in the Z direction (i.e., the main scanning direction). Thus, the lens 220 having a substantially columnar shape is configured to receive the reflected light from each section of the recording medium P in the width direction thereof.

According to the above configuration, in the in-line sensor 200, the CCD sensor 204 is configured to output (feedback) a signal according to the focused light, that is, the image density, to a controller 192 (see FIG. 1) of the image forming apparatus 10. The controller 192 is configured to correct images to be formed in the image forming units 16 on the basis of the signal from the in-line sensor 200. In the image forming apparatus 10, the intensity of light from the exposure devices 40 and the image forming positions, for example, are corrected on the basis of the signal from the in-line sensor 200.

A light adjusting portion 224 is provided between the third mirror 218 and the lens 220 in the imaging optical system 206. The light adjusting portion 224 extends across the light path in the Z direction so as to regulate the quantity of light to be focused onto the CCD sensor 204 in the Y direction (i.e., a direction substantially orthogonal to the main scanning direction). Moreover, the quantity of light to be regulated can be adjusted by operating the light adjusting portion 224 from the outside. The quantity of light to be regulated by the light adjusting portion 224 is adjusted such that the quantity of light to be focused onto the CCD sensor 204 is set equal to a predetermined quantity even as the quantity of light emitted from the lamps 212 changes over time. This will be described in detail later.

The setting unit 210 includes a reference roller 226 extending longitudinally in the Z direction. The reference roller 226 has a single detection reference surface 228 that is faced toward the transport path 60 when an image on the recording medium P is to be detected, a single retreated surface 230 that is faced toward the transport path 60 when an image on the recording medium P is not to be detected by the in-line sensor 200, two white reference surfaces 232, a single color reference surface 234 having multiple color patterns formed in the longitudinal direction, and a multi-inspection surface 236 having multiple inspection patterns. In this exemplary embodiment, the reference roller 226 has a polygonal tubular shape with eight or more surfaces formed in the circumferential direction.

The reference roller 226 rotates about a rotary shaft 226A so as to switch surfaces to be faced toward the transport path 60. This switching of the surfaces of the reference roller 226 is performed by a control circuit provided in a circuit board 262 to be described later. The reference roller 226 has a polygonal tubular shape with eight or more surfaces so that the difference in the distance between the center of each surface in the circumferential direction and the edge between adjacent surfaces relative to the center of rotation is minimized. Consequently, the edges between adjacent surfaces of the reference roller 226 are prevented from coming into contact with the light-emitting unit 202 while the distance between each surface of the reference roller 226 and the light emission position (i.e., a window glass 286 to be described later) of each lamp 212 is minimized.

The width of the detection reference surface 228 in the circumferential direction is set to be smaller than those of other surfaces. The detection reference surface 228 is flanked in the circumferential direction by guide surfaces 238 that do not function as the aforementioned references. The detection reference surface 228 serves as a setting surface (positional reference surface) for setting the position of a surface (reflection surface) of a transported recording medium P to be detected (read).

The width of the retreated surface 230 in the circumferential direction is set to be greater than those of other surfaces. The retreated surface 230 serves as a guide surface for guiding the recording medium P when an image on the recording medium P is not to be detected by the in-line sensor 200. The distance from the retreated surface 230 to the axis of the rotary shaft 226A is shorter than the distance from the detection reference surface 228 to the aforementioned axis. Consequently, when an image on the recording medium P is not to be detected by the in-line sensor 200, a transport path with a larger gap from the light-emitting unit 202 (window glass 286) is formed, as compared with when an image on the recording medium P is to be detected by the in-line sensor 200.

The white reference surfaces 232 are to be used for calibrating the imaging optical system 206. Each white reference surface 232 is formed by bonding a white reference film thereon to which a predetermined signal is to be output from the imaging optical system 206. The color reference surface 234 is also used for calibrating the imaging optical system 206, and is formed by bonding a film with reference-color patterns thereon to which predetermined signals according to the respective colors are to be output from the imaging optical system 206.

Figure 4:
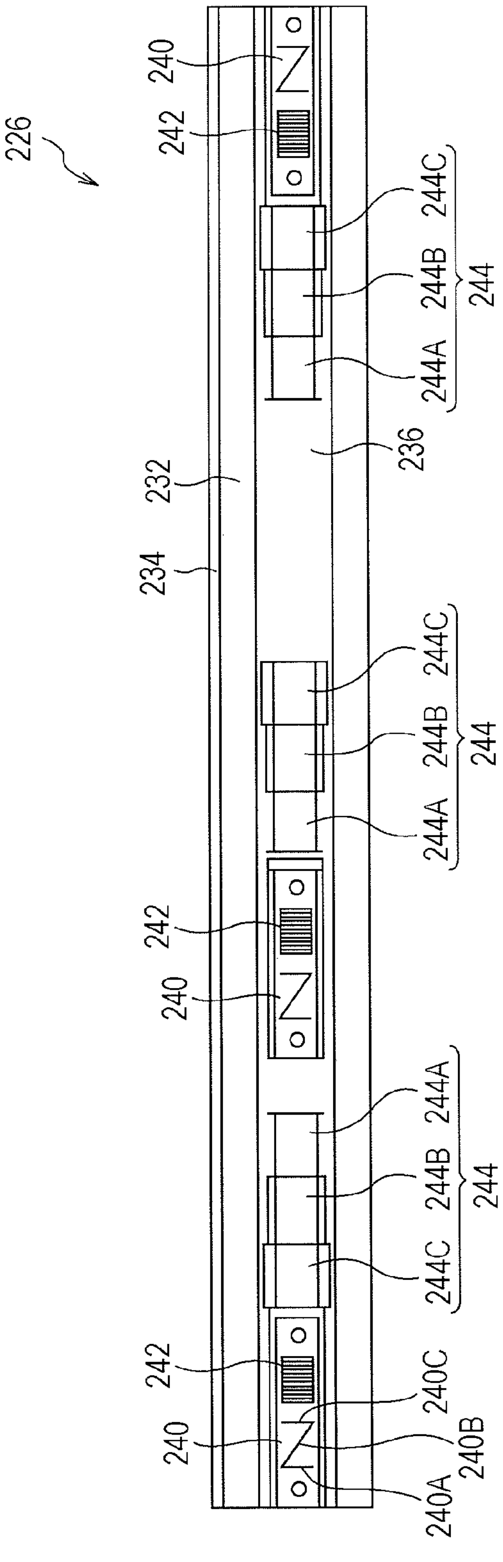
FIG. 4 is a plan view illustrating a multi-inspection surface of a reference roller provided in the in-line sensor according to the exemplary embodiment of the present invention.

Referring to FIG. 4, in the multi-inspection surface 236, positional detection patterns 240 for calibrating the position in the rotational direction of the reference roller 226 (i.e., the transport direction of the recording medium P), focus detection patterns 242, and depth detection patterns 244 are arranged on the same surface.

The positional detection patterns 240 are each formed by bonding a white film having a black N-shaped pattern formed therein such that the vertical lines of the character "N" extend parallel to the transport direction of the recording medium P. The focus detection patterns 242 are each formed by bonding a white film having a ladder-like pattern constituted of multiple black lines arranged in the width direction of the recording medium P.

In each of the depth detection patterns 244, three depth detecting segments 244A, 244B, and 244C with different distances from the rotary shaft 226A of the reference roller 226 are formed by bonding and arranging white films in a stepped manner in the longitudinal direction of the multi-inspection surface 236.

At least one positional detection pattern 240 is provided at each of the opposite longitudinal ends of the multi-inspection surface 236. The focus detection patterns 242 are disposed adjacent to the positional detection patterns 240 at the opposite ends, such that the focus detection patterns 242 are closer to the center of the multi-inspection surface 236 in the longitudinal direction than the positional detection patterns 240 are to the center. The depth detection patterns 244 are provided at a total of three locations, namely, near the opposite ends and the center of the multi-inspection surface 236 in the longitudinal direction. In this exemplary embodiment, a single positional detection pattern 240 and a single focus detection pattern 242 are additionally disposed between the depth detection pattern 244 disposed in the center and the depth detection pattern 244 disposed near one longitudinal end.

A calibration process of the CCD sensor 204 will now be described.

Referring to FIG. 3, one of the white reference surfaces 232 is first faced toward the transport path 60 for the recording medium P. The CCD sensor 204 outputs a shading correction signal for correcting the light-quantity distribution in the Z direction (i.e., the main scanning direction). Subsequently, the multi-inspection surface 236 is faced toward the transport path 60 for the recording medium P, and each positional detection pattern 240 automatically adjusts the detection position by the CCD sensor 204 in the transport direction of the recording medium P. Specifically, the corresponding N-shaped pattern is detected in the Z direction (i.e., the main scanning direction) so that two linear segments 240A and 240C and a diagonal segment 240B interposed therebetween are detected, as shown in FIG. 4. Then, the reference roller 226 is rotated so that the distance between the linear segment 240A and the diagonal segment 240B is equal to the distance between the linear segment 240C and the diagonal segment 240B, whereby the detection position is adjusted.

After adjusting the detection position in the transport direction of the recording medium P, the focal point of the CCD sensor 204 is confirmed by the focus detection patterns 242, and the illumination depth is confirmed by the depth detection patterns 244.

Furthermore, the color reference surface 234 is faced toward the transport path 60 for the recording medium P. The CCD sensor 204 is automatically adjusted so that a signal with a predetermined intensity is output for each color.

The calibration process of the CCD sensor 204 is performed, for example, when the power of the image forming apparatus 10 is turned on (about once per day). A calibration process of the image forming apparatus 10 (i.e., adjustment of the exposure devices 40) based on a signal from the CCD sensor 204 is performed, for example, every time a job for forming images onto a predetermined number of recording media P or more is completed (about 10 times per day).

Dividable Structure of In-Line Sensor

The in-line sensor 200 described above has a three-piece dividable structure including a center unit 246 having the light-emitting unit 202, an upper unit 248 having the imaging unit 208, and a lower unit 250 having the setting unit 210.

The upper unit 248 is attachable to and detachable from the second housing 10B (see FIG. 1) of the image forming apparatus 10 by sliding the upper unit 248 in the Z direction. The center unit 246 is attachable to and detachable from the upper unit 248 by sliding the center unit 246 in the Z direction. The lower unit 250 is attachable to and detachable from the center unit 246 and the upper unit 248 by sliding the lower unit 250 in the Z direction. The lower unit 250 disposed below the transport path 60 for the recording medium P is supported by a lower drawer (not shown) that can be pulled out from the second housing 10B to eliminate a jam of the recording medium P. The lower unit 250 is attached to or detached from the center unit 246 and the upper unit 248 by inserting or pulling out the lower drawer. This will be described in detail below.

Configuration of Upper Unit

The upper unit 248 includes an upper housing 254. The upper housing 254 accommodates the imaging unit 208 and the circuit board 262, to be described later, and forms a cooling duct 265. The upper housing 254 has an imaging-system housing 256 that accommodates the CCD sensor 204 and the imaging optical system 206.

As viewed in the Z direction, the imaging-system housing 256 has a substantially rectangular box shape extending longitudinally in the X direction, and accommodates the CCD sensor 204 at one end in the X direction (i.e., an upstream end in the transport direction of the recording medium P in this exemplary embodiment). The second mirror 216 and the third mirror 218 are disposed at the other end of the imaging-system housing 256 in the X direction. A substantially central portion of the imaging-system housing 256 in the X direction is provided with a window 256A that receives light traveling along the optical axis OA. In the imaging-system housing 256, the window 256A is closed and covered by an optically-transparent window glass 258, thereby providing a sealed (airtight) interior space as well as an optical chamber 205 that accommodates the CCD sensor 204 and like.

The upper housing 254 includes an upper cover 260 that covers the imaging-system housing 256 from above. Thus, a board chamber 264 that accommodates the circuit board 262 is formed between an upper wall 256U of the imaging-system housing 256 and the upper cover 260. The upper housing 254 also includes a duct cover 268 that forms the duct 265 at the outer side of one end of the imaging-system housing 256 in the X direction, which is near where the CCD sensor 204 is disposed. The duct cover 268 covers the aforementioned end of the imaging-system housing 256 from the upstream side in the transport direction of the recording medium P and from the transport path 60 side so as to form the duct 265 having an L-shape in cross section taken along an X-Y plane.

An upper end of the duct 265 serves as an air intake port 266A, and an end of the duct 265 opposite the air intake port 266A serves as a connection port 266B connected to a duct 308 of a lamp housing 284, to be described later. The duct 265 has a fan 270 disposed therein for generating an airflow flowing from top to bottom within the duct 265. The duct 265 also has a fan 272 disposed therein for sending air into the optical chamber 205 provided in the imaging-system housing 256 (so as to set the interior of the optical chamber 205 in a positive pressure state). Moreover, the duct 265 is further provided with a fan (not shown) for sending air into the board chamber 264.

Furthermore, the upper housing 254 includes a cover 275 that covers the imaging-system housing 256 from the second mirror 216 side and the third mirror 218 side. The cover 275 and the imaging-system housing 256 form a thermal insulation space 276 therebetween.

The upper housing 254 is provided with sliders 278 extending longitudinally in the Z direction. In this exemplary embodiment, two sliders 278 are arranged parallel to each other in the X direction on the upper cover 260. The sliders 278 are fitted to rails provided in a frame (not shown) of the second housing 10B. Consequently, the sliders 278 are moved while being guided by the rails, whereby the upper unit 248 is moved in the Z direction relative to the second housing 10B.

Configuration of Center Unit

The center unit 246 includes the lamp housing 284 that accommodates the pair of lamps 212, and a window cover 288 that supports the window glass 286 through which light from the lamps 212 is emitted toward the recording medium P. The lamp housing 284 has a box shape with an upper opening and a lower opening. The upper opening is closed by the upper housing 254, and the lower opening is closed by the window cover 288.

In the light-emitting unit 202, the light from the lamps 212 is emitted to the recording medium P via the window glass 286, and the light reflected by the recording medium P travels along the optical axis OA via the window glass 286 so as to enter the lamp housing 284. The reflected light entering the lamp housing 284 from the recording medium P is guided into the imaging unit 208 via the window glass 258 of the imaging-system housing 256 constituting the imaging unit 208.

The lamp housing 284 includes a pair of sliders 290 extending longitudinally in the Z direction and protruding in the form of a flange in the X direction from the upper opening. The sliders 290 are fitted to rails 292 formed in the upper housing 254. Consequently, the sliders 290 are moved while being guided by the rails 292, whereby the lamp housing 284 is attached to or detached from the upper housing 254 (i.e., the upper unit 248) in the Z direction.

The window cover 288 is configured such that an edge thereof and an edge of the window glass 286 are prevented from facing upstream in the transport direction of the recording medium P. The window glass 286 is positioned to close a window 288A formed in the window cover 288. In this position, opposite longitudinal ends of the window glass 286 are pressed against the window cover 288 by a mounting spring (not shown). Specifically, the window glass 286 is attachable to and detachable from the window cover 288.

Furthermore, the window cover 288 is attachable to and detachable from the lamp housing 284. Specifically, the window cover 288 has a U-shape with an upward-facing opening in cross section taken along the X-Y plane, and is provided with a pair of sliders 298 at the edges of the opening. The sliders 298 are fitted to rails 300 formed in the lamp housing 284. Consequently, the sliders 298 are moved while being guided by the rails 300, whereby the window cover 288 is attached to or detached from the lamp housing 284 in the Z direction. Accordingly, in the in-line sensor 200, the window cover 288 alone can be replaced or cleaned.

Although not shown in the drawings, the center unit 246 and the upper unit 248 can be positioned in the X, Y, and Z directions with high precision by using pins that are engaged with or disengaged from holes in accordance with a relative movement in the Z direction. Furthermore, the upper unit 248 and the second housing 10B can also be positioned in the X, Y, and Z directions with high precision by using pins that are engaged with or disengaged from holes in accordance with a relative movement in the Z direction.

Configuration of Lower Unit

The lower unit 250 includes a lower housing 302 that accommodates the reference roller 226 and a motor (not shown) that drives the reference roller 226. As mentioned above, the lower housing 302 is supported by the lower drawer and is positioned in the Z direction by the lower drawer. The lower unit 250 can be positioned relative to the center unit 246 and the upper unit 248 in the X and Y directions with high precision by using pins that are engaged with or disengaged from holes in accordance with a relative movement in the Z direction. Thus, the lower unit 250 forming the transport path 60 for the recording medium P together with the center unit 246 is positioned in the X, Y, and Z directions relative to the center unit 246 and the upper unit 248.

Countermeasure Against Stray Light

As shown in FIG. 3, the lamp housing 284 is provided with a baffle 304 located above the pair of lamps 212 and surrounding the optical axis OA. The baffle 304 at least has a pair of side walls 304S and a bottom wall 304B. In this exemplary embodiment, the side walls 304S are connected to each other by a pair of front and rear walls (not shown) facing each other in the Z direction. The bottom wall 304B is provided with a lower window 304W through which the optical axis OA extends. An upper opening of the baffle 304 surrounds the window 256A of the imaging-system housing 256. Therefore, light traveling along the optical axis OA enters the imaging unit 208 via the interior of the baffle 304.

The size and the shape of the baffle 304 are set such that the light from the underside of the lamps 212 is prevented from reaching the window 256A. Specifically, the position of the edge of the lower window 304W is set such that the light from the underside of the lamps 212 is prevented from directly reaching the window 256A. Furthermore, an inclination angle of the side walls 304S relative to the optical axis OA is set such that the light from the underside of the lamps 212 is prevented from reaching the window 256A even when the light is reflected once.

Multiple partition walls 306 that partition a space other than a light guiding path formed by the imaging optical system 206 are disposed within the imaging-system housing 256. Each partition wall 306 has an opening 306A serving as a light transmission section whose size (upper limit) is set in accordance with a diffusion angle of light reflected by the recording medium P to an extent that the quantity of diffusion light reflected by the recording medium P is not reduced in the Y direction and the Z direction.

Airflow

In the lamp housing 284, the duct 308 is formed between one of the side walls 304S (i.e., the side wall 304S at the upstream side in the transport direction of the recording medium P in this exemplary embodiment) and a peripheral wall of the lamp housing 284. In a state where the lamp housing 284 is attached to the upper housing 254, an upper opening of the duct 308 is connected to the duct 265 via the connection port 266B. Thus, an airflow generated by actuating the fan 270 is also created within the lamp housing 284.

In the peripheral wall of the lamp housing 284, an air discharge port 310 is formed in an area located opposite the duct 308 in the X direction. Therefore, the airflow from the duct 265 flows via the first lamp 212A at the upstream side and the second lamp 212B at the downstream side in the transport direction of the recording medium P while being guided within the lamp housing 284 by the peripheral wall of the lamp housing 284 and the window cover 288, and is discharged outward from the lamp housing 284 via the air discharge port 310.

A projection 312 for preventing the light from the underside of the first lamp 212A from reaching the lower window 304W projects downward from the lower edge of one of the side walls 304S constituting the duct 308. The projecting amount of the projection 312 is set such that the cooling effect by the air flowing toward the pair of lamps 212 is the same for the pair of lamps 212.

Light Adjusting Portion

Figure 5:
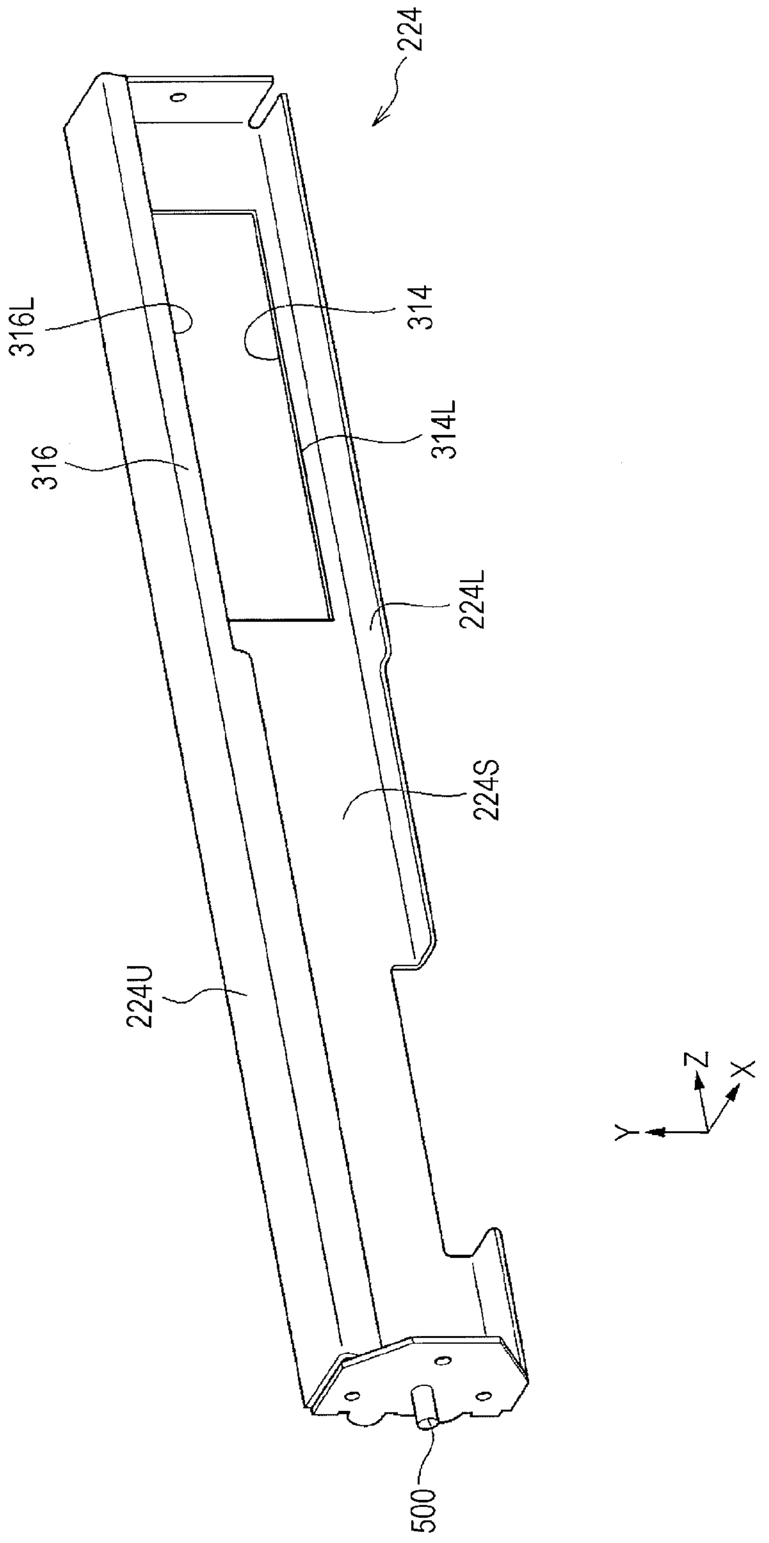
FIG. 5 is a perspective view illustrating a light adjusting portion in the in-line sensor according to the exemplary embodiment of the present invention.

Referring to FIGS. 3 and 5, the light adjusting portion 224 has a side wall 224S serving as an example of a first wall, an upper wall 224U, and a lower wall 224L, and has a U-shape with an opening facing toward the third mirror 218 in cross section taken along the X-Y plane. The side wall 224S of the light adjusting portion 224 is provided with a rectangular opening 314. A rib 316 serving as an example of a second wall extends downward from a free edge of the upper wall 224U. The light adjusting portion 224 is configured to block a light beam at a lower edge 314L of the opening 314 and a lower edge 316L of the rib 316 so as to regulate the quantity of light from both sides in the Y direction.

Figure 6A:
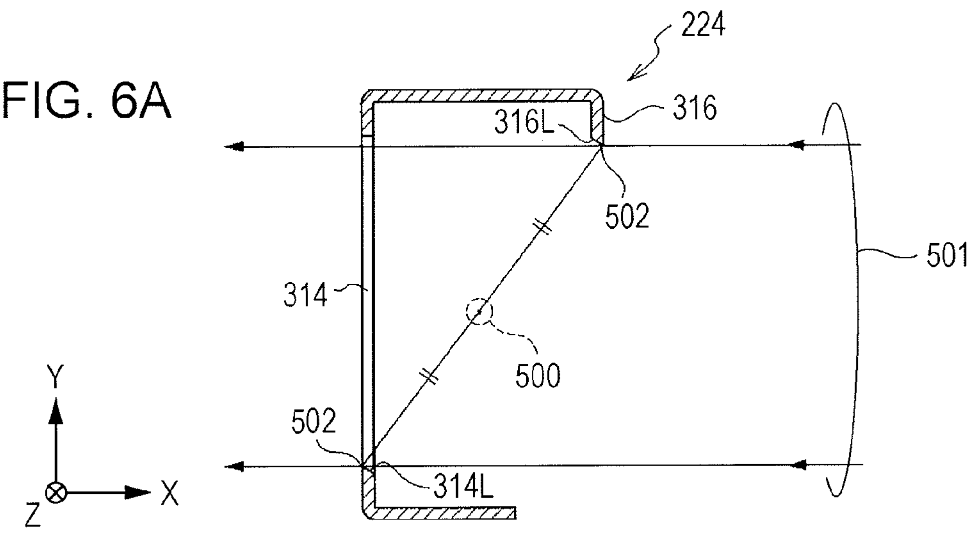
FIGS. 6A to 6C illustrate a light-quantity adjustment process performed using the light adjusting portion in the in-line sensor according to the exemplary embodiment of the present invention, FIG. 6A illustrating a state where the quantity of light is 100% when the angle of the light adjusting portion is 0°, FIG. 6B illustrating a state where the quantity of light is 50% when the angle of the light adjusting portion is 33°, and FIG. 6C illustrating a state where the quantity of light is 0% when the angle of the light adjusting portion is 50°.
Figure 6B:
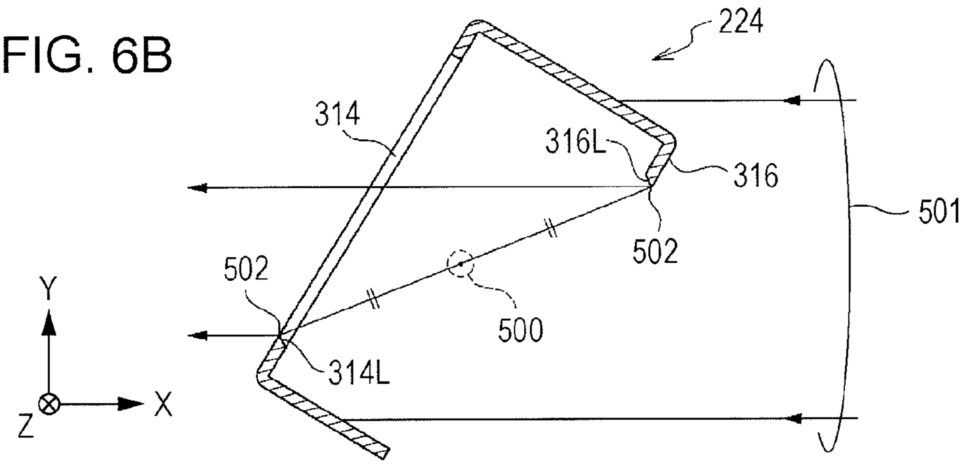
Figure 6C:
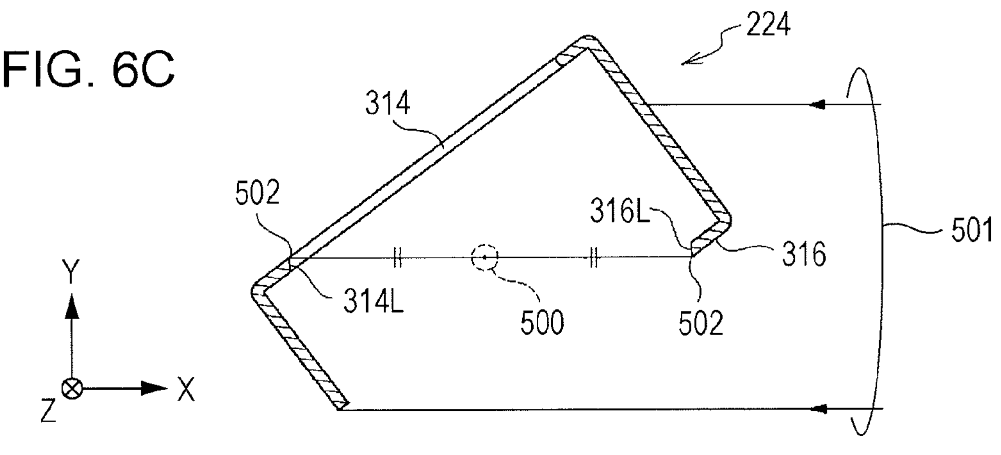

Referring to FIGS. 5 to 6C, a rotary shaft 500 is provided at the front surface of the light adjusting portion 224. As specifically shown in FIGS. 6A to 6C which are cross-sectional views of the light adjusting portion 224 taken along the X-Y plane, the rotary shaft 500 extends in the Z direction and is provided at a midpoint of a line that connects the lower edge 316L of the rib 316 and the lower edge 314L of the opening 314. By rotating the rotary shaft 500, the light adjusting portion 224 is rotated about the rotary shaft 500 in the X-Y plane. As the light adjusting portion 224 rotates, the lower edge 316L of the rib 316 and the lower edge 314L of the opening 314 are positionally shifted, whereby the quantity by which a light beam 501 is blocked changes in the Y direction. Consequently, the quantity of light to be focused onto the CCD sensor 204 located downstream is adjusted.

The lower edge 316L of the rib 316 and the lower edge 314L of the opening 314 each have a sharp-angled section 502. Because the light beam 501 is blocked at the sharp-angled sections 502, ghosting that can be caused by reflection and diffraction of light in the light adjusting portion 224 may be minimized. Consequently, an image defect may be detected with high accuracy in the CCD sensor 204.

The light adjusting portion 224 is formed by bending a single punched metal plate. Therefore, edges formed as the result of the punching process are directly used as the sharp-angled section 502 at the lower edge 316L of the rib 316 and the sharp-angled section 502 at the lower edge 314L of the opening 314. Additionally, the lower edge 316L of the rib 316 and the lower edge 314L of the opening 314 may be given a knife-edging treatment (i.e., machined).

Figure 7:
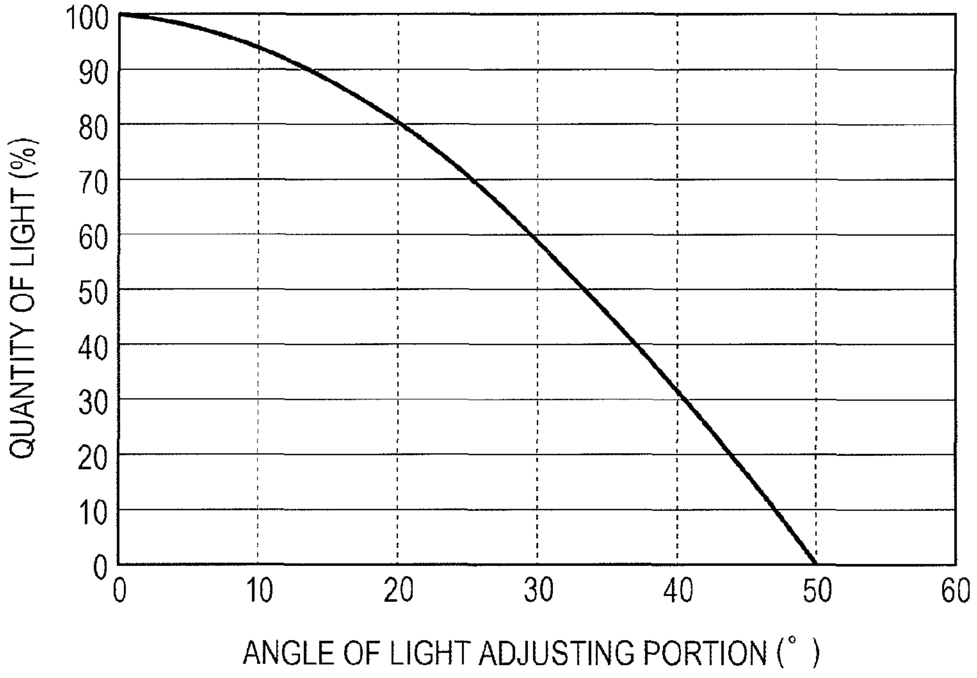
FIG. 7 is a graph illustrating the relationship between the quantity of light and the angle of the light adjusting portion in the in-line sensor according to the exemplary embodiment of the present invention.

Referring to FIGS. 6A to 7, if the quantity of light when the angle of the light adjusting portion 224 is 0° is defined as 100%, the quantity of light decreases with increasing angle. The quantity of light reaches 0% when the angle of the light adjusting portion 224 is 50°. Accordingly, by providing the rotary shaft 500 in the light adjusting portion 224 at the midpoint of the line that connects the lower edge 316L of the rib 316 and the lower edge 314L of the opening 314, the rotation angle of the light adjusting portion 224 rotated during the light-quantity adjustment process is controlled to a range between 0° and 50°. This allows for a compact, space-saving light adjusting portion 224.

Figure 8C:
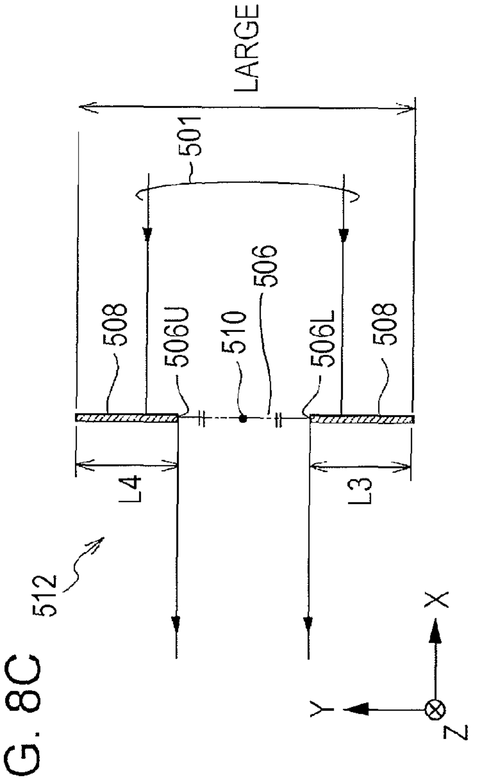
FIGS. 8A to 8D illustrate a light-quantity adjustment process performed using a light adjusting portion corresponding to the light adjusting portion in the in-line sensor according to the exemplary embodiment of the present invention and a light-quantity adjustment process performed using a light adjusting portion according to a comparative example.
Figure 8D:
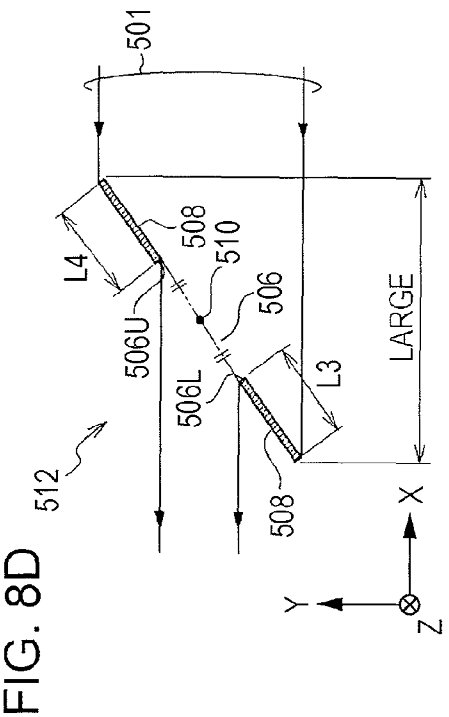
Figure 8A:
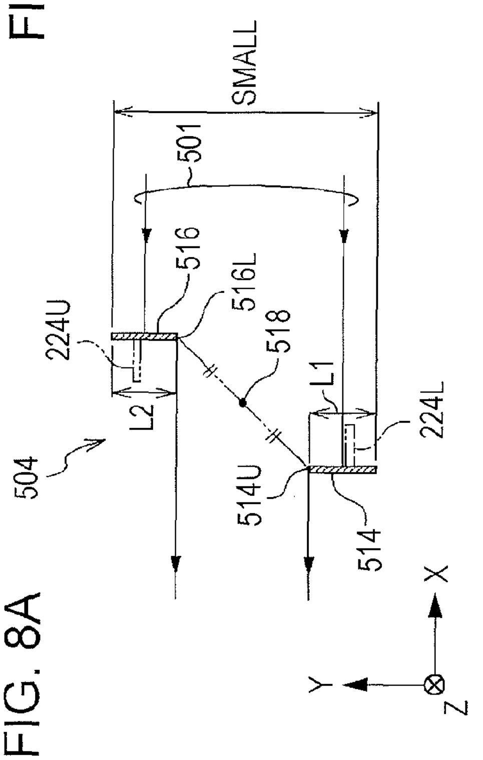
Figure 8B:
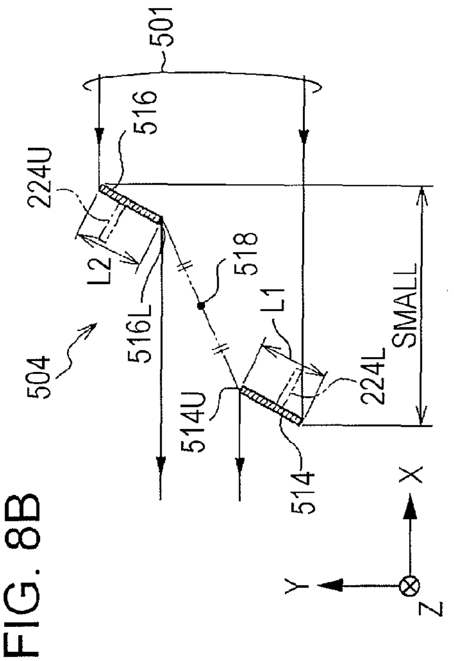

The operation of the above-described configuration will now be described with reference to FIGS. 8A to 8D. FIGS. 8A and 8B illustrate a light-quantity adjustment process performed using a light adjusting portion 504 that corresponds to the light adjusting portion 224 according to this exemplary embodiment. FIGS. 8C and 8D illustrate a comparative example in which a light-quantity adjustment process is performed using a light adjusting portion 512 provided with a rotary shaft 510 in a single wall 508 having an opening 506.

As shown in FIG. 8A, in the light adjusting portion 504, the lower side of the light beam 501 is blocked at an upper edge 514U of a first wall 514, and the upper side of the light beam 501 is blocked at a lower edge 516L of a second wall 516. The first wall 514 and the second wall 516 are separated from each other with a certain distance therebetween in the traveling direction of the light. A rotary shaft 518 is provided at a midpoint of a line that connects the upper edge 514U of the first wall 514 and the lower edge 516L of the second wall 516. As shown in FIG. 8B, when the rotary shaft 518 is rotated, the first wall 514 and the second wall 516 are rotated about the rotary shaft 518, causing the upper edge 514U of the first wall 514 and the lower edge 516L of the second wall 516 to be positionally shifted. Thus, the quantity of light is reduced to one-half.

In the light adjusting portion 504, the quantity of light is reduced to one-half by rotating the light adjusting portion 504 by about 25°. Therefore, in FIG. 8B, a length L1 of the first wall 514 and a length L2 of the second wall 516 for blocking the light beam 501 may be set to small values. This allows for an entirely compact, space-saving light adjusting portion 504.

In contrast, as shown in FIG. 8C, in the light adjusting portion 512, the lower side of the light beam 501 is blocked at a lower edge 5061 of the opening 506 provided in the wall 508, and the upper side of the light beam 501 is blocked at an upper edge 506U of the opening 506. The rotary shaft 510 is provided at a midpoint between the upper edge 506U and the lower edge 5061 of the opening 506. As shown in FIG. 8D, when the wall 508 is rotated about the rotary shaft 510, the light adjusting portion 512 should be rotated by about 50° in order to reduce the quantity of light to one-half. Therefore, in FIG. 8D, a length L3 of a lower segment and a length L4 of an upper segment of the wall 508 for blocking the light beam 501 may need to be set to large values. This leads to a large overall size of the light adjusting portion 512.

Because the light beam 501 is blocked at the upper wall 224U and the lower wall 224L in the light adjusting portion 224, the light adjusting portion 224 may have a smaller size and occupy less space in the Y direction, as compared with the light adjusting portion 504 (see imaginary lines in FIGS. 8A and 8B). Furthermore, because the light adjusting portion 224 is formed by bending a single metal plate, the rigidity thereof is increased, whereby variations in the quantity of light occurring in the sub-scanning direction due to vibration produced when the recording medium P is transported may be prevented.

Figure 9:
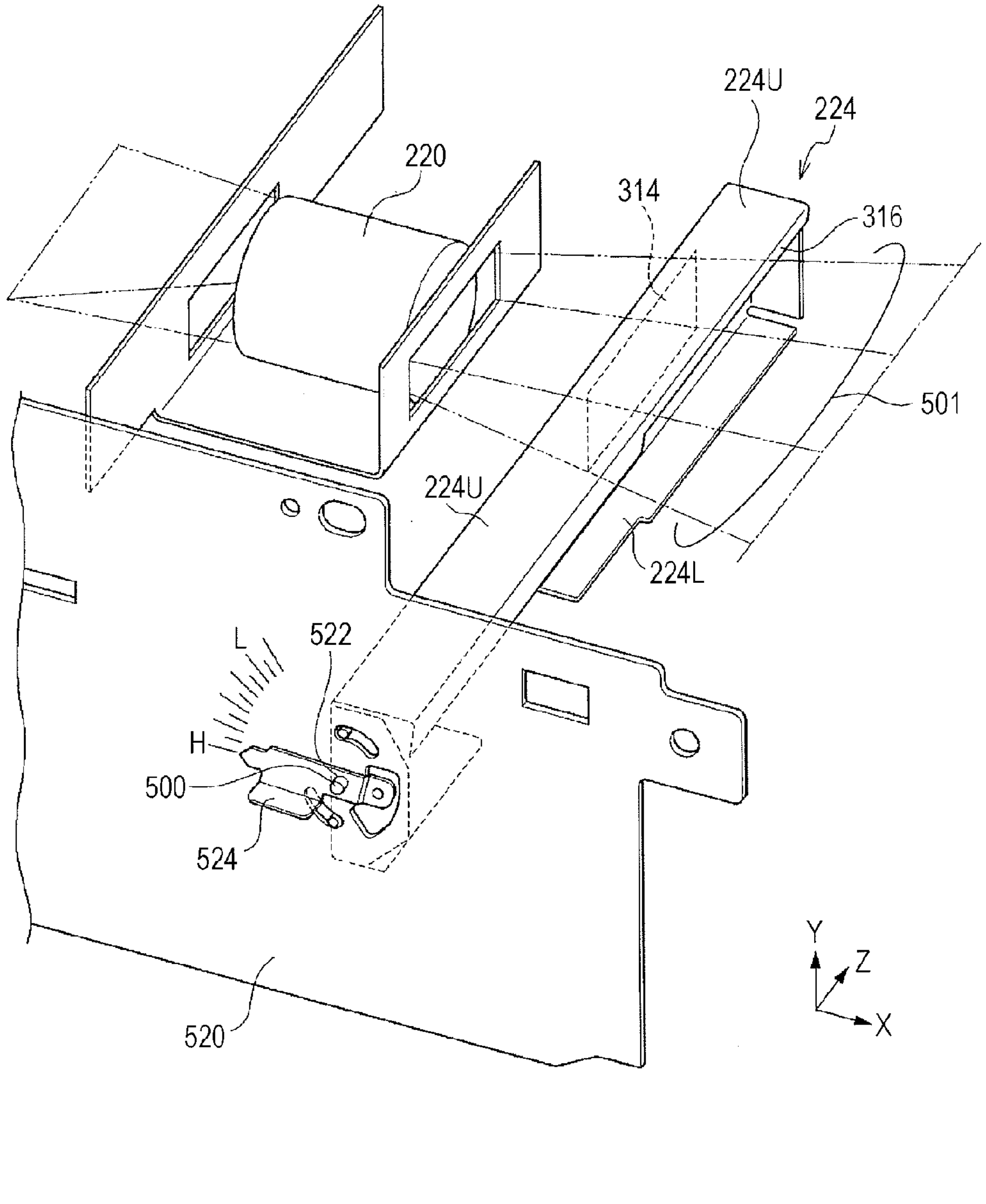
FIG. 9 is a perspective view illustrating an adjustment lever of the light adjusting portion in the in-line sensor according to the exemplary embodiment of the present invention.

Referring to FIG. 9, one longitudinal end of the light adjusting portion 224 extends to a housing 520 at the front surface of the imaging-system housing 256. An adjustment lever 524 serving as an example of an operating section is attached to the one longitudinal end of the light adjusting portion 224 via an operation hole 522 formed in the housing 520.

Figure 10:
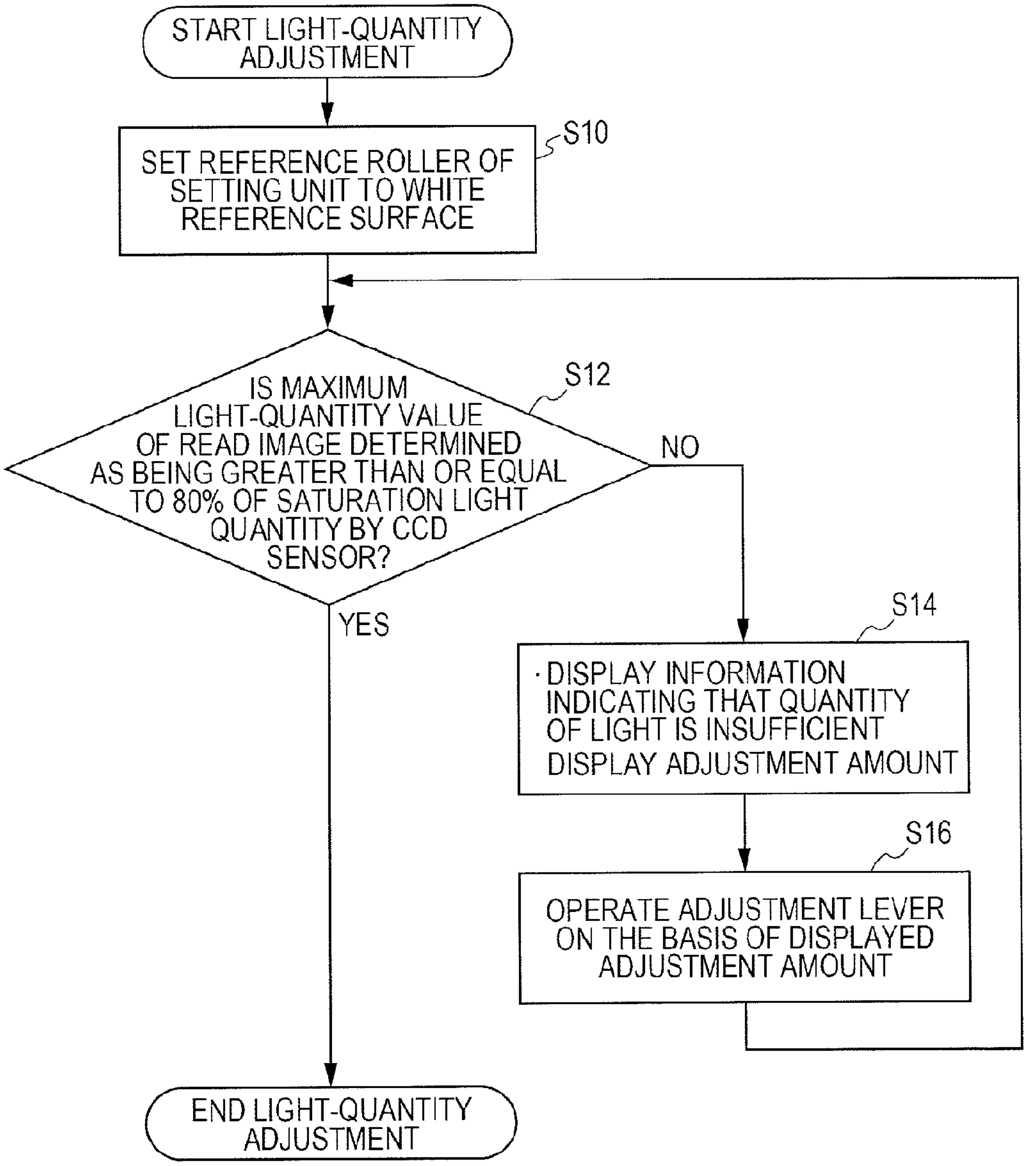
FIG. 10 is a flow chart illustrating the flow of the light-quantity adjustment process performed using the light adjusting portion in the in-line sensor according to the exemplary embodiment of the present invention.

The light-quantity adjustment process performed using the light adjusting portion 224 will now be described with reference to a flow chart shown in FIG. 10. In step S10, the reference roller 226 of the setting unit 210 is set to one of the white reference surfaces 232. Specifically, the white reference surface 232 of the reference roller 226 is faced toward the transport path 60 so as to serve as a reading surface. In step S12, the CCD sensor 204 determines whether or not a maximum light-quantity value of a read image is greater than or equal to 80% of a saturation light quantity.

If NO in step S12, the process proceeds to step S14 where a monitor 15 (see FIG. 1) displays information indicating that the quantity of light is insufficient. The monitor 15 also displays an adjustment amount by which the adjustment lever 524 should be adjusted in order to achieve a sufficient quantity of light. In step S16, the adjustment lever 524 is operated on the basis of the adjustment amount displayed on the monitor 15. This operation may be performed manually by an operator who operates the image forming apparatus 10 or automatically by using an appropriate driving motor.

If YES in step S12, it is confirmed that the light-quantity adjustment process is properly performed using the light adjusting portion 224, thus ending the light-quantity adjustment process.

Accordingly, due to time-dependent degradation of the lamps 212, the light adjusting portion 224 is rotated in response to the operation of the adjustment lever 524 so as to be adjusted gradually from an initial position corresponding to where the quantity of light is regulated to a position corresponding to where the amount of regulation is reduced. Therefore, the quantity of light to be focused onto the CCD sensor 204 is set equal to a predetermined quantity even as the quantity of light emitted from the lamps 212 changes over time.

Jam Prevention Structure

Figure 11:
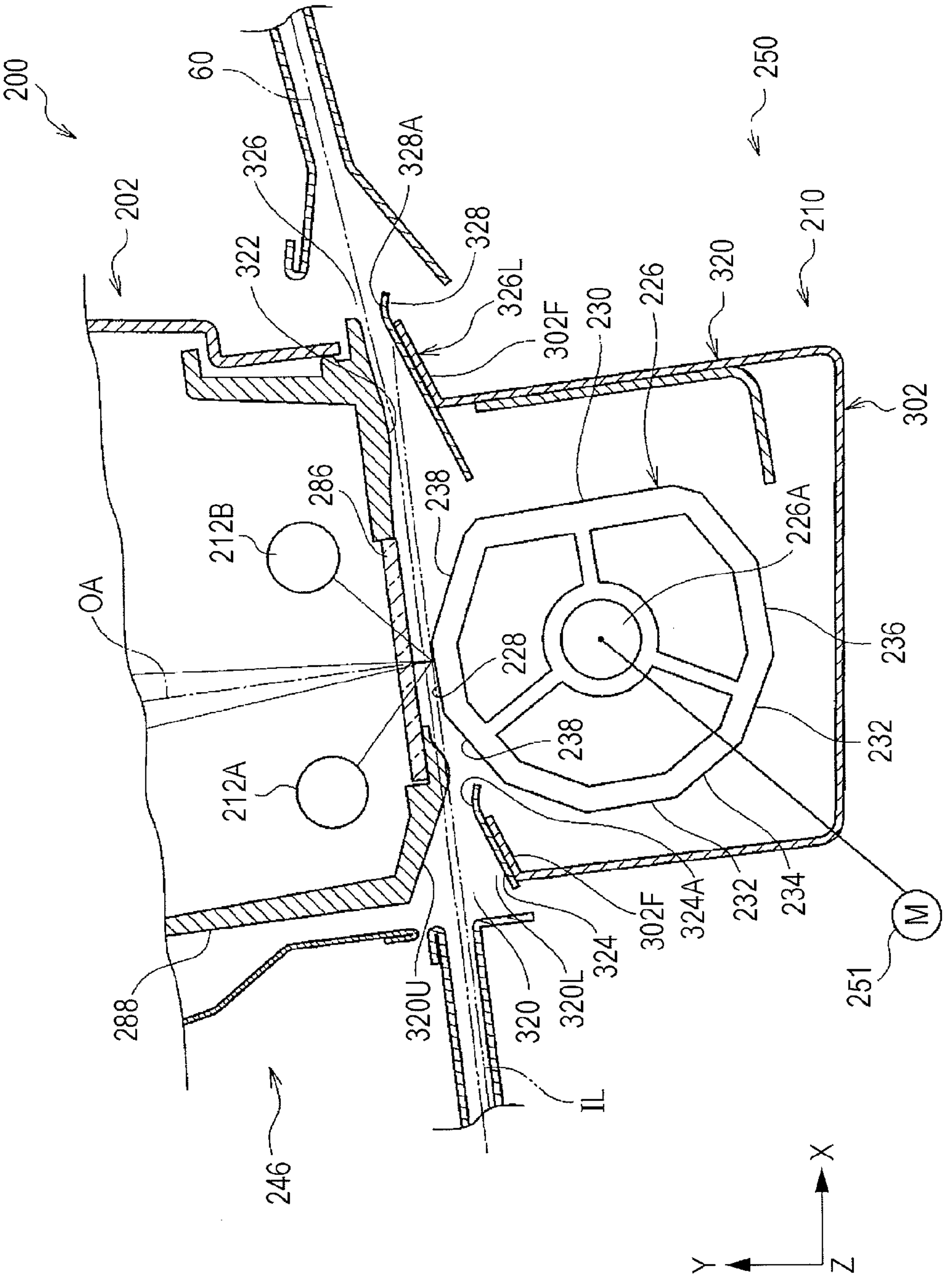
FIG. 11 is a cross-sectional view illustrating a center unit and a lower unit in the in-line sensor according to the exemplary embodiment of the present invention, with a transport path for a recording medium interposed therebetween.

Referring to FIG. 11, the transport path 60 between the center unit 246 (i.e., the light-emitting unit 202) and the lower unit 250 (i.e., the setting unit 210) increases in height toward the downstream side in the transport direction of the recording medium P. The window cover 288 and the lower housing 302 have their edges chamfered or curved so that an entrance chute 320 serving as an entrance section and facing upstream in the transport direction of the recording medium P is formed in the in-line sensor 200.

An upper chute 320U serving as an upper portion of the entrance chute 320 has a smooth curved surface that protrudes downward. In a state where the detection reference surface 228 of the reference roller 226 is faced toward the transport path 60 for the recording medium P, if an extension line of the detection reference surface 228, as viewed in the Z direction, is defined as IL, the size and the shape of the upper chute 320U are set such that the upper chute 320U interferes with the extension line IL (i.e., the protruding end of the upper chute 320U is positioned below the extension line IL).

In the window cover 288, a protrusion 322 having a smooth curved surface that protrudes downward is formed downstream of the window glass 286 in the transport direction of the recording medium P. The protrusion 322 is positioned above the extension line IL.

A lower chute 320L serving as a lower portion of the entrance chute 320 is located near the reference roller 226 due to a lower chute member 324 fixed to a flange 302F extending inward from an opening of the lower housing 302. A downstream end of the lower chute member 324 in the transport direction of the recording medium P is provided with a curved section 324A that is curved in an upwardly convexed shape.

An exit chute 326 is formed between the lower housing 302 and a downstream portion of the protrusion 322 in the transport direction of the recording medium P. A lower chute 326L serving as a lower portion of the exit chute 326 is formed by fixing a lower chute member 328 onto another flange 302F extending outward from the opening of the lower housing 302. A downstream end of the lower chute member 328 in the transport direction of the recording medium P is provided with a curved section 328A that is curved in an upwardly convexed shape.

When an image is to be detected by the CCD sensor 204, the detection reference surface 228 of the reference roller 226 is faced toward the recording medium P so as to be positioned substantially parallel to the window glass 286. The guide surfaces 238 that flank the detection reference surface 228 receive the recording medium P from the entrance chute 320 and guide the recording medium P toward the exit chute 326.

On the other hand, when an image is not to be detected by the CCD sensor 204, the retreated surface 230 of the reference roller 226 is faced toward the recording medium P (in a non-parallel position) such that the distance from the retreated surface 230 to the window glass 286 gradually decreases toward the downstream side in the transport direction of the recording medium P. The retreated surface 230 is a wide surface extending from the curved section 324A of the lower chute member 324 to near the exit chute 326, and is set in the aforementioned position so as to receive the recording medium P from the entrance chute 320 and guide the recording medium P toward the exit chute 326.

Operation of In-Line Sensor

Referring to FIG. 3, the in-line sensor 200 uses the pair of lamps 212 to emit light to the recording medium P passing through between the light-emitting unit 202 and the setting unit 210. The light reflected by the recording medium P is guided to the imaging unit 208 along the optical axis OA and is focused onto the CCD sensor 204 by the imaging optical system 206 of the imaging unit 208. The CCD sensor 204 outputs a signal according to the image density at each position of the image to the controller 192 of the image forming apparatus 10. The controller 192 corrects the image density and the image forming position on the basis of the signal from the CCD sensor 204.

When performing the calibration process of the CCD sensor 204 constituting the in-line sensor 200, the motor in the lower unit 250 is first actuated so that one of the white reference surfaces 232 is faced toward the transport path 60 for the recording medium P. The CCD sensor 204 is adjusted so as to output a predetermined signal.

Subsequently, the multi-inspection surface 236 shown in FIG. 4 is faced toward the transport path 60 for the recording medium P, and the detection position of the CCD sensor 204 is adjusted so that the linear segment 240A and the diagonal segment 240B of each positional detection pattern 240 is equal to the distance between the linear segment 240C and the diagonal segment 240B. Then, the CCD sensor 204 confirms whether each ladder pattern is in a readable focused state. Furthermore, it is confirmed by each depth detection pattern 244 whether the output is within a reference range regardless of the illumination depth.

Subsequently, the color reference surface 234 is faced toward the transport path 60 for the recording medium P. The CCD sensor 204 is adjusted so that the predetermined signal is output for each color.

According to the exemplary embodiment of the present invention, because the imaging unit 208 is provided with the light adjusting portion 224 that adjusts the quantity of light to be focused onto the CCD sensor 204, the quantity of light focused on the CCD sensor 204 may be kept constant in correspondence with time-dependent degradation of the lamps 212, thereby minimizing the effect of fluctuations in the quantity of light caused by time-dependent degradation of the lamps 212. By keeping the quantity of light focused on the CCD sensor 204 constant, the CCD sensor 204 may perform image detection with an appropriate signal-to-noise ratio, whereby an image defect may be detected with high accuracy.

Furthermore, the rotary shaft 500 is provided at the midpoint of the line connecting the lower edge 316L of the rib 316 and the lower edge 314L of the opening 314, as viewed in a cross section taken through the light adjusting portion 224 along the X-Y plane. Therefore, the lower edge 316L of the rib 316 and the lower edge 314L of the opening 314 that block the light beam 501 are rotated about the rotary shaft 500 at the midpoint, thereby allowing for a compact, space-saving light adjusting portion 224. In addition, the upper side and the lower side of the light beam 501 are blocked by the same quantity with respect to the rotational amount of the rotary shaft 500.

Furthermore, because the lower edge 316L of the rib 316 and the lower edge 314L of the opening 314 are provided with the sharp-angled sections 502 such that the light beam 501 is blocked at the sharp-angled sections 502, ghosting that can be caused by reflection and diffraction of light may be minimized, whereby an image defect may be detected with high accuracy in the CCD sensor 204.

Furthermore, because the light adjusting portion 224 is formed by bending a single punched metal plate, the sharp-angled section 502 at the lower edge 316L of the rib 316 and the sharp-angled section 502 at the lower edge 314L of the opening 314 may be readily provided by using edges formed as the result of the punching process.

Furthermore, because the adjustment lever 524 that is operable for rotation of the rotary shaft 500 is provided at the outer side of the housing 520 that covers the imaging unit 208, the light-quantity adjustment process may be performed using the light adjusting portion 224 while the imaging unit 208 is maintained in a sealed state.

Furthermore, because the image forming apparatus 10 is equipped with the in-line sensor 200, toner images can be detected within the apparatus.

Although light is emitted toward the front face of the recording medium P in this exemplary embodiment, the light may alternatively be emitted toward the rear face of the recording medium P if the recording medium P is of a type that can transmit light.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A detecting device comprising:

a detecting unit configured to detect an image on a medium transported in a transport path, wherein the detecting unit includes:

a light emitter configured to emit light toward the transport path in which the medium is transported, a light receiver configured to receive reflected light of the light emitted from the light emitter, and a light adjusting portion that is on a path of the reflected light between the light emitter and the light receiver and is configured to rotate, in response to an amount of the emitted light changing, in order to adjust a quantity of the reflected light that is focused onto the light receiver, wherein the light adjusting portion includes:

a first wall configured to block a light beam from a first side in a direction substantially orthogonal to a traveling direction of the reflected light, a second wall that is provided at a position separated from the first wall by a certain distance in the traveling direction of the reflected light and that is configured to block the light beam from a second side in the direction substantially orthogonal to the traveling direction of the reflected light, and a rotary shaft that is provided at a midpoint of a line connecting an edge of the first wall adjacent to the traveling direction of the reflected light beam and an edge of the second wall adjacent to the traveling direction of the reflected light beam and that is configured to rotate the first wall and the second wall about the midpoint.

2. The detecting device according to claim 1, wherein the edge of the first wall and the edge of the second wall are each provided with a sharp-angled section.

3. The detecting device according to claim 2, wherein the first wall and the second wall are formed by bending a single punched plate.

4. The detecting device according to claim 3, wherein an operating section operable for rotation of the rotary shaft is provided at an outer side of a housing that covers the detecting unit.

5. An image forming apparatus comprising the detecting device according to claim 4.

6. An image forming apparatus comprising the detecting device according to claim 3.

7. The detecting device according to claim 2, wherein an operating section operable for rotation of the rotary shaft is provided at an outer side of a housing that covers the detecting unit.

8. An image forming apparatus comprising the detecting device according to claim 7.

9. An image forming apparatus comprising the detecting device according to claim 2.

10. The detecting device according to claim 1, wherein the first wall and the second wall are formed by bending a single punched plate.

11. The detecting device according to claim 10, wherein an operating section operable for rotation of the rotary shaft is provided at an outer side of a housing that covers the detecting unit.

12. An image forming apparatus comprising the detecting device according to claim 11.

13. An image forming apparatus comprising the detecting device according to claim 10.

14. The detecting device according to claim 1, wherein an operating section operable for rotation of the rotary shaft is provided at an outer side of a housing that covers the detecting unit.

15. An image forming apparatus comprising the detecting device according to claim 14.

16. An image forming apparatus comprising the detecting device according to claim 1.

17. The detecting device according to claim 1, wherein adjusting the quantity of the reflected light that is focused onto the light receiver by rotating the light adjusting portion causes the quantity of light focused onto the light receiver before the change in the amount of light emitted by the light e -r to be substantially equal to the quantity of light focused onto the light receiver after the change in the amount of light emitted by the light emitter.

18. A detecting method comprising:

emitting light toward a transport path in which a medium is transported;

receiving reflected light of the emitted light using a light receiver;

detecting an image on the medium transported in the transport path; and adjusting a quantity of received light by rotating a light adjusting portion in response to an amount of the emitted light changing, in order to adjust a quantity of the reflected light that is focused onto the light receiver, wherein the light adjusting portion includes a first wall, a second wall that is provided at a position separated from the first wall by a certain distance in the traveling direction of the reflected light, and a rotary shaft that is provided at a midpoint of a line connecting an edge of the first wall adjacent to the traveling direction of the reflected light beam and an edge of the second wall adjacent to the traveling direction of the reflected light beam, and wherein adjusting the quantity of received light by rotating the light adjusting portion includes:

blocking, using the first wall, a light beam from a first side in a direction substantially orthogonal to a traveling direction of the reflected light;

blocking, using the second wall, the light beam from a second side in the direction substantially orthogonal to the traveling direction of the reflected light; and rotating the rotary shaft in order to rotate the first wall and the second wall about the midpoint.

19. A device for detecting an image on a medium transported in a transport path, the device comprising:

a light emitter configured to emit light toward the transport path;

a light receiver configured to receive reflected light from the light emitter; and a light adjusting portion that is on a path of the reflected light between the light emitter and the light receiver and is configured to adjust a quantity of the reflected light received by the light receiver, wherein the light adjusting portion includes:

a first wall configured to block a light beam from a first side in a direction substantially orthogonal to a traveling direction of the reflected light;

a second wall that is provided at a position separated from the first wall by a certain distance in the traveling direction of the reflected light and that is configured to block the light beam from a second side in the direction substantially orthogonal to the traveling direction of the reflected light; and a rotary shaft that is provided at a midpoint of a line connecting an edge of the first wall adjacent to the traveling direction of the reflected light beam and an edge of the second wall adjacent to the traveling direction of the reflected light beam and that is configured to rotate the first wall and the second wall about the midpoint, and wherein in response to a quantity of the emitted light changing, the light adjusting portion is rotates in accordance with the quantity of the emitted light changing so that a quantity of light received by the light receiver remains substantially constant.

* * * * *